(12) United States Patent
Shoji et al.

(10) Patent No.: US 10,344,354 B2
(45) Date of Patent: Jul. 9, 2019

(54) NICKEL RECOVERY PROCESS

(71) Applicant: SUMITOMO METAL MINING CO., LTD., Tokyo (JP)

(72) Inventors: Hirofumi Shoji, Ehime (JP); Jiro Hayata, Ehime (JP); Keiji Kudou, Ehime (JP); Tatsuya Higaki, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 210 days.

(21) Appl. No.: 15/503,430

(22) PCT Filed: Jul. 23, 2015

(86) PCT No.: PCT/JP2015/071032
§ 371 (c)(1),
(2) Date: Feb. 13, 2017

(87) PCT Pub. No.: WO2016/024470
PCT Pub. Date: Feb. 18, 2016

(65) Prior Publication Data
US 2017/0240994 A1  Aug. 24, 2017

(30) Foreign Application Priority Data

Aug. 13, 2014 (JP) ................. 2014-164790

(51) Int. Cl.
*C25C 1/08* (2006.01)
*C22B 7/00* (2006.01)
(Continued)

(52) U.S. Cl.
CPC ............ *C22B 23/0407* (2013.01); *C22B 3/44* (2013.01); *C22B 3/46* (2013.01); *C22B 7/00* (2013.01);
(Continued)

(58) Field of Classification Search
CPC ........... C22B 3/46; C22B 7/006; C22B 7/007; C22B 23/0407; C22B 23/043; C22B 23/0469; C25C 1/08
See application file for complete search history.

(56) References Cited

U.S. PATENT DOCUMENTS 1,808,938 A * 6/1931 Seil .................. C01B 17/033
4,067,952 A   1/1978 Pittie et al.

FOREIGN PATENT DOCUMENTS

CA   1039065 A    9/1978
EP   1 325 165 B1 9/2006
(Continued)

OTHER PUBLICATIONS

Apr. 3, 2018 Search Report issued in European Patent Application No. 15831422.9.
(Continued)

*Primary Examiner* — Tima M McGuthry-Banks
(74) *Attorney, Agent, or Firm* — Oliff PLC

(57) ABSTRACT

A nickel recovery process capable of decreasing nickel remaining in a byproduct by recovering nickel from the byproduct of electrolytic nickel manufacturing process by chlorine-leaching, and also, capable of simplifying a cementation step simultaneously, is provided. In a nickel recovery step S60, a nickel recovery step S70 and a nickel recovery step S80, nickel is recovered in each step from $S^0$ slurry, residue flaker and chlorine-leached residue, which are byproducts of electrolytic nickel manufacturing process by chlorine-leaching, by using an aqueous solution containing 80 g/L to 390 g/L of chlorine and 30 g/L to 70 g/L of copper.

8 Claims, 6 Drawing Sheets

(51) Int. Cl.
  *C22B 3/46*    (2006.01)
  *C22B 23/00*   (2006.01)
  *C22B 3/00*    (2006.01)
  *C22B 3/44*    (2006.01)

(52) U.S. Cl.
  CPC .............. *C22B 7/006* (2013.01); *C22B 7/007* (2013.01); *C22B 23/043* (2013.01); *C22B 23/0423* (2013.01); *C22B 23/0461* (2013.01); *C22B 23/0469* (2013.01); *C25C 1/08* (2013.01); *Y02P 10/234* (2015.11); *Y02P 10/236* (2015.11)

(56) References Cited

FOREIGN PATENT DOCUMENTS

| | | | | |
|---|---|---|---|---|
| EP | 2 584 055 A1 | | 4/2013 | |
| FR | 2 320 356 A1 | | 3/1977 | |
| GB | 1520117 A | * | 8/1978 | ......... C22B 23/0423 |
| GB | 1524417 A | * | 9/1978 | ......... C22B 23/0469 |
| JP | S58-126937 A | | 7/1983 | |
| JP | H02-197533 A | | 8/1990 | |
| JP | H11-80986 A | | 3/1999 | |
| JP | 2012-026027 A | | 2/2012 | |
| JP | 2012-107264 A | | 6/2012 | |
| JP | 2013-253276 A | | 12/2013 | |

OTHER PUBLICATIONS

Oct. 27, 2015 International Search Report issued in International Patent Application No. PCT/JP2015/071032.

* cited by examiner

NICKEL RECOVERY PROCESS

BACKGROUND OF THE INVENTION

Field of the Invention

The present invention relates to a process for recovering nickel from a byproduct of an electrolytic nickel manufacturing process by chlorine-leaching. The present application claims priority based on Japanese Patent Application No. 2014-164790 filed in Japan on Aug. 13, 2014.

Description of Related Art

In a conventional hydrometallurgical process of nonferrous metal, with nickel sulfide as a raw material, which is a mixture of nickel, cobalt and else, produced by sulfuric acid leaching from low-grade laterite ore and nickel matte produced from pyrometallurgy, most of metals such as nickel, cobalt, copper and else contained in the raw material are chlorine-leached. And, in the hydrometallurgical process, an electrolytic nickel is manufactured by electrowinning after removing metal impurities and else from a solution obtained by chlorine-leaching.

Concretely, there is an electrolytic nickel manufacturing process (MCLE process) by chlorine-leaching, and its flow chart is illustrated in FIG. 7. As illustrated in FIG. 7, the electrolytic nickel manufacturing process comprises: a chlorine-leaching step S11 for generating a copper-containing nickel chloride solution, which is a chlorine leachate, by chlorine-leaching metal such as nickel with nickel sulfide as a raw material; a cementation step S21 for fixing univalent copper ion by adding nickel matte and chlorine-leached residue to the copper-containing nickel chloride solution obtained by the chlorine-leaching step S11; a solution purification step S31 for removing impurities other than nickel from a cementation final solution; an electrolytic step S41 for obtaining electrolytic nickel by electrominning from a nickel chloride solution obtained by the solution purification step S31; and a sulfur recovery step S51 for recovering product sulfur from the chlorine-leached residue obtained by the chlorine-leaching step S11.

In the electrolytic nickel manufacturing process, producing the copper-containing nickel chloride solution via chlorine-leaching with nickel sulfide as the raw material, manufacturing the electrolytic nickel from the copper-containing nickel chloride solution, and performing the cementation treatment for fixing and removing copper in the copper-containing nickel chloride solution efficiently, are important for manufacturing high quality electrolytic nickel. As the technology relating to this cementation treatment, for example, it is proposed in patent document 1.

However, in the electrolytic nickel manufacturing process, as illustrated in FIG. 7, copper contained in nickel sulfide will be fixed and removed from the chlorine leachate (copper-containing nickel chloride solution) obtained via the chlorine-leaching step S11 by transporting it to the cementation step S21. A cementation residue containing fixed copper will be returned to the chlorine-leaching step S11 again, and in the chlorine-leaching step S11, univalent copper ion becomes bivalent copper ion by reacting with chlorine gas, and nickel will be leached by oxidation power of the bivalent copper ion. In addition, copper contained in nickel matte is also fixed and removed as well as copper contained in nickel sulfide.

In other words, in the chlorine-leaching step S11 and the cementation step S21, copper is circulating in a state maintaining a prescribed concentration (normally 40 g/L to 60 g/L). Therefore, for example, when treatment capacity of nickel sulfide produced from hydrometallurgy is increased for the purpose of increasing manufacturing of electrolytic nickel, amount of copper circulated in a system of the electrolytic nickel manufacturing process will be increased inevitably.

By the way, in the cementation step S21, as mentioned above, the bivalent copper ion contained in the copper-containing nickel chloride solution will be reduced to univalent copper ion by nickel matte added as the raw material, and fixed by sulfur in the chlorine-leached residue.

However, nickel metal or nickel subsulfide, which is a major form of nickel matte, prioritizes a function to reduce bivalent copper ion to univalent copper ion, and univalent copper ion generated by remained nickel metal and else will be fixed as copper sulfide. Therefore, when the amount of copper circulating in the system of the electrolytic nickel manufacturing process is increased, relatively, amount of nickel matte for fixing as sulfide after reducing to univalent copper ion from bivalent copper ion will be decreased, so there is a case that copper in the copper-containing nickel chloride solution cannot be fixed and removed surely and efficiently.

Furthermore, when the amount of copper circulating in the system is increased by increased treatment of nickel sulfide as the raw material, along with increased manufacturing of electrolytic nickel, capability for removing copper will be insufficient with amount of nickel matte as well as conventional amount, in order to remove copper in the copper-containing nickel chloride solution, therefore the amount of nickel matte must be also increased, so it will not be possible to remove copper efficiently and effectively.

From the above reasons, in patent document 1, it is not possible to respond to the increase of the amount of copper circulating in the system, so the cementation treatment capable of removing copper contained in the copper-containing nickel chloride solution efficiently and effectively is desired.

In order to respond to this kind of demand, a technology for removing copper efficiently and effectively by fixing copper by adding nickel matte and chlorine-leached residue after reducing copper by adding nickel sulfide to nickel chloride solution containing copper (copper-containing nickel chloride solution) is proposed in patent document 2, patent document 3, and else. The technology described in patent document 2 and patent document 3 have been applied in real operation, and as a result, most of the above problems have been resolved.

Patent Document 1: Japanese Patent Application Laid-Open No. H11-080986

Patent Document 2: Japanese Patent Application Laid-Open No. 2012-107264

Patent Document 3: Japanese Patent Application Laid-Open No. 2012-026027

SUMMARY OF THE INVENTION

However, by the technology described in patent document 2 and patent document 3, a residue containing nickel, cobalt, and else is obtained as a byproduct from a sulfur recovery step. A part of this residue (Hereinafter, often referred to as "$S^0$ slurry".) is returned to the chlorine-leaching step or the cementation step, and a part (Hereinafter, often referred to as "residue flaker".) is discharged out of the system. Also, as other byproduct, chlorine-leached residue is also generated.

These byproducts respectively contains 5 wt % to 20 wt % of nickel, and especially, the residue flaker is discharged out of the system, so there is a problem that it will be a loss of nickel as a whole process. Also, about nickel contained in S⁰ slurry and chlorine-leached residue, they will be circulated in the system, so it will not be a loss, but it is necessary to operate while holding valuables in the process, so it is disadvantageous with respect to interest.

In order to decrease nickel contained in these byproducts, increasing leaching tank to prolong leaching time or slurrying the byproducts again after solid-liquid separation for leaching at high concentration and else could be considered easily, but equipment of leaching tank or additional chlorine and water for repulping will be necessary, so it is disadvantageous with respect to material cost and water balance of a plant.

On the other hand, when performing the technology described in patent document 2 or patent document 3 in real operation, it is necessary to configure cementation step to be at least two phase steps. For example, as illustrated in FIG. 8, at first, in first cementation step S22, reducing copper by adding nickel sulfide to nickel chloride solution containing copper (copper-containing nickel chloride solution), and then, in second cementation step S23, it is necessary to fix copper by adding nickel matte and chlorine-leached residue.

The two phase steps are a main continuing path through which most of treated water in the process passes, therefore, it is necessary to operate each step simultaneously and suitably, so a cost for controlling the steps in real operation will be high and it is disadvantageous compared to simple one phase step.

From the above, in the electrolytic nickel manufacturing process by chlorine-leaching, a technology capable of decreasing nickel remaining in a byproduct by recovering nickel from the byproduct, and also, capable of simplifying the cementation step simultaneously, is requested.

The present invention is proposed considering these actual circumstances, and a purpose of the present invention is to provide a nickel recovery process capable of decreasing nickel remaining in a byproduct by recovering nickel from the byproduct of the electrolytic nickel manufacturing process by chlorine-leaching, and further, capable of simplifying the cementation step simultaneously.

The inventors accomplished the present invention, as a result of keen examination for achieving the above purpose, by finding that it is possible to decrease nickel remaining in the byproduct by mixing the byproduct with prescribed aqueous solution when recovering nickel from the byproduct of the electrolytic nickel manufacturing process.

In other word, a nickel recovery process relating to the present invention for achieving the above purpose is a nickel recovery process for recovering nickel from a byproduct of an electrolytic nickel manufacturing process by chlorine-leaching, comprising: a chlorine-leaching step for obtaining a chlorine leachate and a chlorine-leached residue by oxidizing and leaching nickel sulfide; a cementation step for fixing and removing copper in the chlorine leachate; a sulfur recovery step for obtaining a sulfur-containing solution and a residue by solid-liquid separation after slurrying the chlorine-leached residue in a melting tank; and a nickel recovery step for obtaining slurry by adding an aqueous solution with a chlorine dissolving amount of 80 g/L to 390 g/L, and also, with a copper concentration of 30 g/L to 70 g/L to the byproduct containing 5 wt % to 20 wt % of nickel and for solid-liquid separating the slurry into solid phase and liquid phase, wherein the liquid phase is returned into a transportation path from the chlorine-leaching step to the cementation step.

In the nickel recovery process, it is preferable that the slurry is having a slurry concentration that solid content is 130 g/L to 350 g/L.

In the nickel recovery process, it is possible to return the solid phase into the cementation step, when the byproduct is slurry repulped from the residue.

In the nickel recovery process, it is possible to return the slurry into the cementation step without solid-liquid separation, when the byproduct is slurry repulped from the residue.

In the nickel recovery process, it is possible to discharge the solid phase out of a system of the electrolytic nickel manufacturing process, when the byproduct is adhering substances adhered to an inner wall of the melting tank.

In the nickel recovery process, it is possible to return the solid phase into the sulfur recovery step, when the byproduct is a part of the chlorine-leached residue.

In the nickel recovery process, it is preferable to use the chlorine leachate instead of the aqueous solution.

By the present invention, it is possible to decrease nickel remaining in the byproduct, and also, it is possible to simplify the cementation step simultaneously, by recovering nickel from the byproduct of the electrolytic nickel manufacturing process by chlorine-leaching.

DETAILED DESCRIPTION OF THE INVENTION

It will be explained in detail about the concrete embodiments applying the present invention (Hereinafter, referred to as "present embodiment") along with the following items. In addition, the present invention will not be limited by the following embodiments, and these embodiments can be modified in various ways without departing from the gist of the present invention.

1. Summary of nickel recovery process
2. Chlorine-leaching step
3. Cementation step
4. Solution purification step
5. Electrolytic step
6. Sulfur recovery step
7. Nickel recovery step using S⁰ slurry
8. Nickel recovery step using residue flaker
9. Nickel recovery step using chlorine-leached residue

[1. Summary of Nickel Recovery Process]

Figure 1:
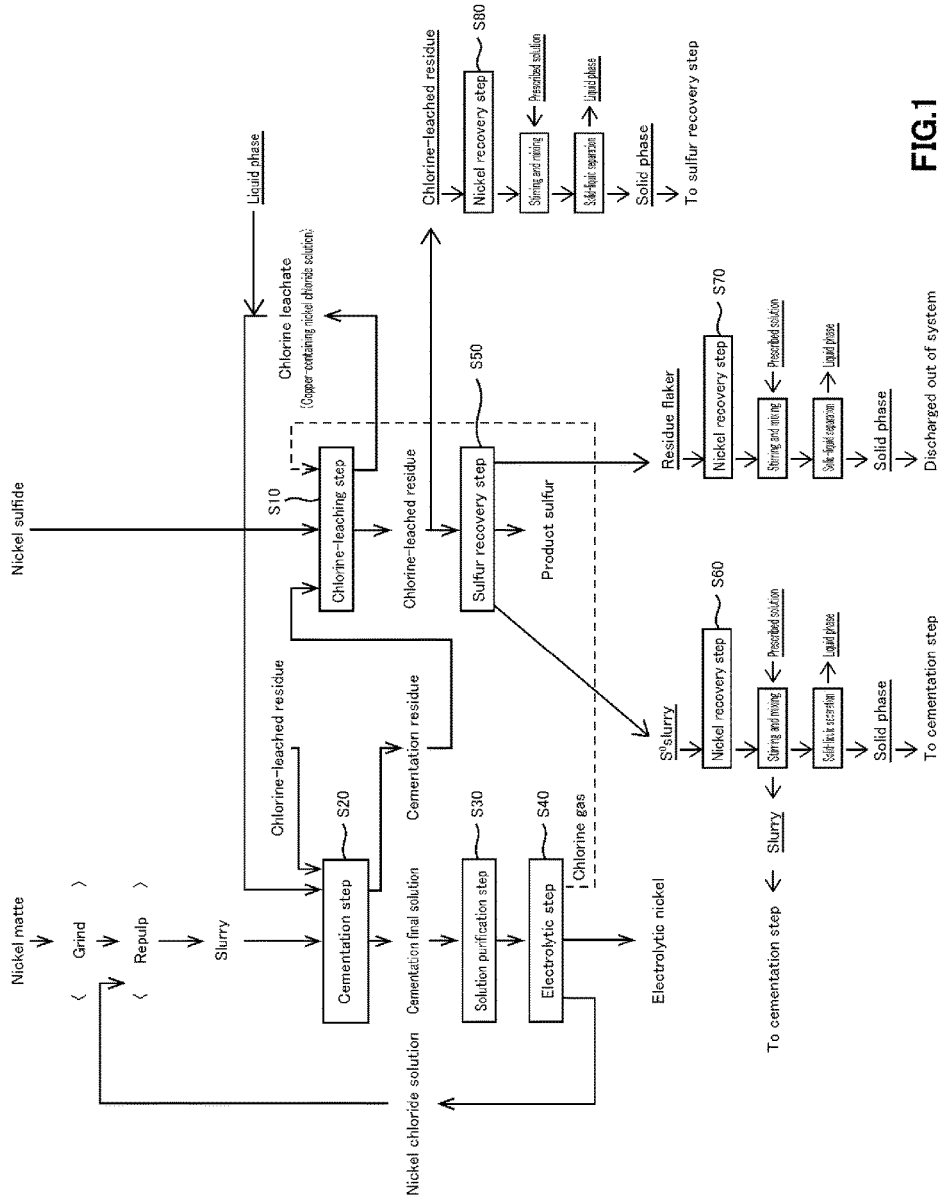
FIG. 1 is a flowchart of electrolytic nickel manufacturing process by chlorine-leaching applying nickel recovery process relating to the present invention.

Nickel recovery process relating to the present embodiment is a process for recovering nickel from $S^0$ slurry, residue flaker and chlorine-leached residue, which are byproducts of an electrolytic nickel manufacturing process by chlorine-leaching, in a nickel recovery step S60, a nickel recovery step S70 and a nickel recovery step S80, as illustrated in FIG. 1.

More specifically, explaining about the present embodiment using an electrolytic nickel manufacturing process applying a nickel recovery process. As illustrated in FIG. 1, an electrolytic nickel manufacturing process comprises: a chlorine-leaching step S10 for generating a copper-containing nickel chloride solution, which is a chlorine leachate, by chlorine-leaching metal such as nickel with nickel sulfide as a raw material; and a cementation step S20 for fixing univalent copper ion by adding nickel matte and chlorine-leached residue to the copper-containing nickel chloride solution obtained by the chlorine-leaching step S10.

Further, as steps after the cementation step S20, the electrolytic nickel manufacturing process comprises: a solution purification step S30 for removing impurities other than nickel from a cementation final solution; and an electrolytic step S40 for obtaining electrolytic nickel by electrowinning from a nickel chloride solution obtained from the solution purification step S30.

Also, as steps after the chlorine-leaching step S10, the electrolytic nickel manufacturing process comprises: a sulfur recovery step S50 for recovering product sulfur from the chlorine-leached residue obtained from the chlorine-leaching step S10; a nickel recovery step S60 for stirring and mixing $S^0$ slurry obtained from the sulfur recovery step S50 added with a prescribed solution; a nickel recovery step S70 for obtaining liquid phase and solid phase by solid-liquid separation after stirring and mixing a residue flaker obtained from the sulfur recovery step S50 added with a prescribed solution; and a nickel recovery step S80 for obtaining liquid phase and solid phase by solid-liquid separation after stirring and mixing a part of the chlorine-leached residue obtained from the chlorine-leaching step S10 added with a prescribed solution.

In the electrolytic nickel manufacturing process, it is possible to decrease nickel remaining in each byproduct by recovering nickel through the above each steps, and at the same time, it is possible to achieve simplification of the cementation step S20 in the electrolytic nickel manufacturing process.

[2. Chlorine-leaching Step]

In a chlorine-leaching step S10, a copper-containing nickel chloride solution is generated as a chlorine leachate by oxidizing and leaching metal components such as nickel or copper by chlorine gas, for example with nickel sulfide manufactured by hydrometallurgy from nickel oxide ore as a raw material. The chlorine leachate containing copper (copper-containing nickel chloride solution) generated from the chlorine-leaching step S10 is transported to a cementation step S20.

On the other hand, impurities mainly composed of sulfur remaining in solid phase in chlorine-leaching step S10 will be chlorine-leached residue, and product sulfur will be collected through a sulfur recovery step S50 in the following description. Also, a chlorine-leached residue extracting a part of the chlorine-leached residue will be collected of nickel in the chlorine-leached residue in a nickel recovery step S80 in the following description.

In addition, in electrolytic nickel manufacturing process, there is a case that excess copper will be removed by electrolytic deposition by arranging unillustrated copper removal electrolytic step, during transportation of the chlorine leachate (copper-containing nickel chloride solution) from the chlorine-leaching step S10 to a cementation step S20 in the following description.

However, by applying nickel recovery process to the electrolytic nickel manufacturing process, it is possible to decrease oxidation-reduction potential on the basis of Ag/AgCl of transported chlorine leachate (copper-containing nickel chloride solution). Therefore, it is possible to decrease electric power necessary for electrolysis, as ratio of bivalent copper ion with respect to univalent copper ion is decreased.

[3. Cementation Step]

In the cementation step S20, the copper-containing nickel chloride solution generated in the chlorine-leaching step S10 is transported and copper in the copper-containing nickel chloride solution is fixed and removed. In the cementation step S20, a slurry repulped by nickel chloride solution generated in the following step of an electrolytic step S40 by grinding a raw material of nickel matte produced for example from pyrometallurgy is added to the copper-containing nickel chloride solution.

Also, in the cementation step S20, a chlorine-leached residue mainly composed of sulfur generated as a byproduct in the chlorine-leaching step S10 is added. Further, in the cementation step S20, $S^0$ slurry generated as a byproduct in a sulfur recovery step S50 may be added.

In the cementation step S20, as indicated in the following reaction formula 1 and reaction formula 2, copper in the copper-containing nickel chloride solution is removed by fixing it as copper sulfide, by reducing bivalent copper ion in the copper-containing nickel chloride solution and sulfur in the chlorine-leached residue to univalent copper ion and bivalent sulfur ion by reduction power of nickel subsulfide and nickel metal in nickel matte.

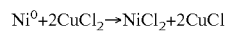    (Reaction Formula 1)

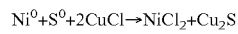    (Reaction Formula 2)

In the cementation step S20, nickel in a solution in which copper has been fixed and removed will be bivalent nickel ion, and its solution will be transported to the solution purification step S30 as a cementation final solution. On the other hand, sulfide of copper remaining in solid phase by fixation or unreacted nickel will be transported to the chlorine-leaching step S10 again as a cementation residue.

As a reaction temperature in the cementation step S20, preferably it is 70° C. to 100° C., more preferably it is 80° C. to 90° C. When the temperature condition is less than 70° C., it will be difficult to reduce bivalent copper ion remaining in the copper-containing nickel chloride solution to univalent copper ion, and a progress of reaction to fix univalent copper ion by sulfur will be stagnated.

Therefore, in the cementation step S20, by setting a temperature condition to 70° C. or more, it is possible to reduce remaining bivalent copper ion to univalent copper ion, and it is possible to progress a reaction to fix the univalent copper ion efficiently by sulfur.

In addition, also for cobalt and copper in nickel matte, unreacted substance will be transported to the chlorine-leaching step S10 as the cementation residue, and metal ion will be transported to the solution purification step S30 as the cementation final solution, by similar reaction as nickel.

[4. Solution Purification Step]

In the solution purification step S30, the cementation final solution is transported from the cementation step S20, and impurities other than nickel such as iron, cobalt and copper contained in the cementation final solution are removed by solution purification treatment, for example oxidizing and neutralizing process and else. Concretely, in the solution purification step S30, there are a deironization step, a cobalt removal step, a deleading step, and a dezincification step, as unillustrated main steps.

[5. Electrolytic Step]

In the electrolytic step S40, electrolytic nickel is manufactured by electrowinning, using nickel chloride solution obtained by the solution purification step S30. In the electrolytic step S40, at cathode side, nickel ion in nickel chloride solution deposits as metal and electrolytic nickel will be generated. Also, at anode side, chlorine ion in nickel chloride solution generates as chlorine gas and it will be used in the chlorine-leaching step S10 and else.

[6. Sulfur Recovery Step]

In the sulfur recovery step S50, the chlorine-leached residue obtained in the chlorine-leaching step S10 is heated in the melting tank to melt contained sulfur content, and the chlorine-leached residue will be slurried, and this slurry is charged into a solid-liquid separation device to obtain a product sulfur as liquid phase. Also, residue obtained as solid phase is grinded and repulped to obtain $S^0$ slurry. Nickel in the obtained $S^0$ slurry is recovered in the following nickel recovery step S60.

Also, when slurrying the chlorine-leached residue, the residue, which cannot be charged into the solid-liquid separation device and attaches to inner wall of the melting tank with insufficient melting even by heating, will be obtained, but this residue is called residue flaker. Nickel in the obtained residue flaker will be recovered in the following nickel recovery step S70.

In addition, when slurrying the chlorine-leached residue, it is possible to use a solution, which does not contain cupric chloride, but there is a problem that leaching speed decreases as the concentration of cupric chloride at the time of mixing treatment in the following nickel recovery step S60 decreases. Further, when using the solution, which does not contain cupric chloride, it is necessary to evaporate excess water by heating and else, in order to restore water balance in the step, and cost for applying thermal energy and else will be increased.

[7. Nickel Recovery Step Using $S^0$ Slurry]

In a nickel recovery step S60, after obtaining slurry by mixing and stirring $S^0$ slurry obtained in the sulfur recovery step S50 and a prescribed solution, liquid phase and solid phase are obtained by solid-liquid separation.

In the nickel recovery step S60, the obtained liquid phase is returned into a transportation path from the chlorine-leaching step S10 to the cementation step S20, and joins the chlorine-leached residue. Also, the obtained solid phase is charged into the cementation step S20. In addition, in the nickel recovery step S60, the obtained slurry may be charged into the cementation step S20 without solid-liquid separation.

Here, in the nickel recovery step S60, it is preferable that slurry concentration of the obtained slurry is adjusted that solid content will be 130 g/L to 350 g/L.

When the solid content is less than 130 g/L, a problem occurs that it will be difficult to restore water balance of a plant, as an amount of solution will be increased too much, or a problem occurs that a propulsion of reduction into univalent copper ion from bivalent copper ion will be decreased and it will be time-consuming, when a grade of nickel in $S^0$ slurry, which is a byproduct of the electrolytic nickel manufacturing process, is low.

On the other hand, when the solid content is more than 350 g/L, a problem occurs that a special pump will be necessary for transportation of slurry thereafter, as a viscosity of slurry will be too high.

For stirring of $S^0$ slurry and prescribed solution, a publicly known technology is applied for effective contact of the $S^0$ slurry and the prescribed solution. In other words, in the nickel recovery step S60, a stirring means with ability to stir in a range of amount of solid content in the above slurry concentration may be selected.

When joining the slurry obtained by mixing and stirring $S^0$ slurry and prescribed solution into the chlorine leachate, an aqueous solution containing at least 80 g/L to 390 g/L as chlorine dissolving amount, and also, containing at least 30 g/L to 70 g/L as copper concentration, is used as the prescribed solution. In this way, 15 wt % to 20 wt % of nickel remained in $S^0$ slurry is leached by chlorine dissolved in the prescribed solution, so it is possible to decrease nickel remaining in finally obtained solid phase. Concretely, nickel in the solid phase can be decreased to be the extent of 11 wt % to 16 wt %.

Leached nickel will be incorporated into finally obtained liquid phase, and joined to the chlorine leachate by returning the liquid phase into the transportation path from the chlorine-leaching step S10 to the cementation step S20, so amount of nickel contained in the chlorine leachate increases, and nickel leaching rate in the chlorine-leaching step S10 increases seemingly.

In the nickel recovery step S60, a water balance in a system will be broke, as prescribed solution is added, but it will be fine by a countermeasure to discharge a water in the system, which almost does not contain nickel, for example a barren solution (unillustrated), to the amount matches the added water, or by a countermeasure to evaporate the water in the system by heating, and else.

As the prescribed solution, chlorine leachate containing copper generated from the chlorine-leaching step S10 (copper-containing nickel chloride solution), or aqueous solution containing chloride ion such as nickel chloride solution discharged in the electrolytic step S40 is preferable as concentration of cupric chloride will not be decreased at the time of mixing treatment, and aqueous solution containing cupric chloride is more preferable. For example, when chlorine leachate (copper-containing nickel chloride solution) is used, restoration measures for broken water balance in the system will not be necessary, and more efficient operation will be possible.

[8. Nickel Recovery Step Using Residue Flaker]

In a nickel recovery step S70, after obtaining slurry by mixing and stirring a residue flaker obtained in the sulfur recovery step S50 and a prescribed solution, liquid phase and solid phase are obtained by solid-liquid separation. In addition, about slurry concentration, stirring means, and prescribed solution, they are similar as the nickel recovery step S60, so the explanation will be abbreviated here.

In the nickel recovery step S70, obtained liquid phase is returned into a transportation path from the chlorine-leaching step S10 to the cementation step S20, and joins the chlorine leachate. Also, obtained solid phase is discharged out of the system.

Here, when joining the liquid phase to the chlorine leachate, aqueous solution similar as prescribed solution of nickel recovery step S60 is used as the prescribed solution. In this way, 5 wt % to 7 wt % of nickel remaining in the residue flaker is leached by chlorine dissolved in the prescribed solution, and not only that nickel remaining in finally obtained solid phase will be decreased to the extent of 2 wt %, but also it is possible to decrease a loss of nickel in the whole process.

Leached nickel is incorporated in finally obtained liquid phase, and joined to the chlorine leachate by returning the liquid phase into the transportation path from the chlorine-leaching step S10 to the cementation step S20, so amount of nickel contained in the chlorine leachate increases, and nickel leaching rate in the chlorine-leaching step S10 increases seemingly.

In the nickel recovery step S70, a water balance in a system will be broke, as prescribed solution is added, but it will be fine by a countermeasure to discharge a water in the system, which almost does not contain nickel, for example a barren solution (unillustrated), to the amount matches the added water, or by a countermeasure to evaporate the water in the system by heating, and else.

Liquid amount of liquid phase obtained by solid-liquid separating slurry is equal to liquid amount of prescribed solution. Therefore, weight of obtained solid phase is equal to weight of residue flaker obtained in the sulfur recovery step S51 and discharged out of the system in the prior art illustrated in FIG. 7, so there will be no harmful effect to the whole process even if the solid phase is discharged out of the system.

[9. Nickel Recovery Step Using Chlorine-leached Residue]

In a nickel recovery step S80, after obtaining slurry by mixing and stirring a chlorine-leached residue partially extracted from a chlorine-leached residue charged into the sulfur recovery step S50 and a prescribed solution, liquid phase and solid phase are obtained by solid-liquid separation. In addition, about slurry concentration, stirring means, and prescribed solution, they are similar as the nickel recovery step S60, so the explanation will be abbreviated here.

In the nickel recovery step S80, obtained liquid phase is returned into a transportation path from the chlorine-leaching step S10 to the cementation step S20, and joins the chlorine leachate. Also, obtained solid phase is charged into the next step of sulfur recovery step S50.

Here, when joining the liquid phase to the chlorine leachate, aqueous solution similar as prescribed solution of nickel recovery step S60 is used as the prescribed solution. In this way, 5 wt % to 7 wt % of nickel remaining in the chlorine-leached residue is leached by chlorine dissolved in the prescribed solution, and it is possible to decrease amount of nickel remaining in finally obtained solid phase. Concretely, it is possible to decrease the amount of nickel to the extent that nickel in the solid phase will be to the extent of 3 wt % to 5 wt %.

Leached nickel is incorporated in finally obtained liquid phase, and joined to the chlorine leachate by returning the liquid phase into the transportation path from the chlorine-leaching step S10 to the cementation step S20, so amount of nickel contained in the chlorine leachate increases, and nickel leaching rate in the chlorine-leaching step S10 increases seemingly.

In the nickel recovery step S80, a water balance in a system will be broke, as prescribed solution is added, but it will be fine by a countermeasure to discharge a water in the system, which almost does not contain nickel, for example a barren solution (unillustrated), to the amount matches the added water, or by a countermeasure to evaporate the water in the system by heating, and else.

In the nickel recovery step, nickel can be recovered by performing at least one step of nickel recovery step S60, nickel recovery step S70, and nickel recovery step S80, and it will be possible to decrease nickel remaining in each byproduct. Within each nickel recovery step, it is preferable to perform the nickel recovery step S70, as nickel discharged out of the system (loss of nickel) will be decreased.

Also, by performing the nickel recovery step S60 or the nickel recovery step S70 in addition to the nickel recovery step S80, or by performing every nickel recovery steps, the chlorine-leached residue after recovering nickel by the nickel recovery step S80 will be charged into the sulfur recovery step S50. Then, recovery of nickel will be performed further, and it is preferable as recovery rate of nickel will be higher than performing the nickel recovery step individually.

Figure 7:
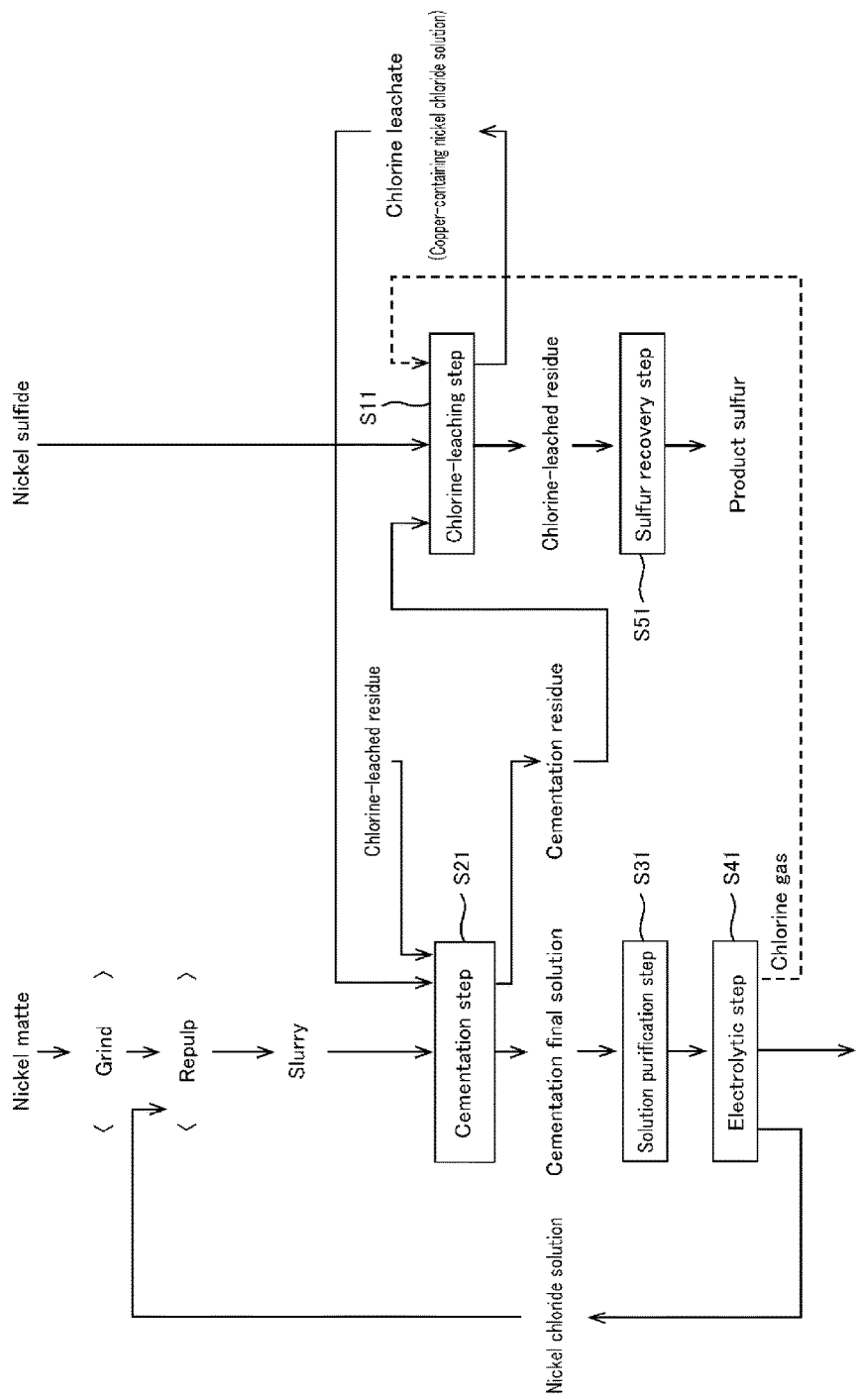
FIG. 7 is a flowchart of conventional electrolytic nickel manufacturing process by chlorine-leaching.

The nickel recovery step is to apply the nickel recovery step, in other words, to add the nickel recovery step S60, nickel recovery step S70, and nickel recovery step S80, to a conventional electrolytic nickel manufacturing process as illustrated in FIG. 7.

In the conventional electrolytic nickel manufacturing process, the cementation treatment capable of removing copper contained in copper-containing nickel chloride solution efficiently and effectively, even when amount of copper circulated in the system is increased, has been desired. However, in the nickel recovery process, the above problem will not be occurred, and further, cementation step can be performed in one step. Present inventors are considering about its reason as follow.

Copper contained in nickel matte and nickel chloride circulates in the system similar to the conventional electrolytic nickel manufacturing process. Therefore, in a purpose of increasing production of electrolytic nickel, for example, when treatment capacity of nickel chloride produced from hydrometallurgy is increased, amount of copper circulated in the system of electrolytic nickel manufacturing process is also increased inevitably.

In other words, when amount of copper circulating in the system of conventional electrolytic nickel manufacturing process illustrated in FIG. 7 is increased, the chlorine leachate obtained from the chlorine-leaching step S11 will be to the extent of 550 mV at oxidation-reduction potential on the basis of Ag/AgCl, and coexisting copper ion will be in the state with excess bivalent copper ions, and it will be short of reduction power of nickel metal throughout the cementation step S21, as univalent copper ion will be reduced at first.

In this point, when applying nickel recovery process relating to the present embodiment to the conventional electrolytic nickel manufacturing process, as illustrated in FIG. 1, by joining liquid phase obtained by solid-liquid separation of slurry obtained by mixing and stirring byproducts of electrolytic nickel manufacturing process ($S^0$ slurry, residue flaker and chlorine-leached residue) and prescribed solution to chlorine leachate by returning the liquid phase into transportation path from the chlorine-leaching step S10 to the cementation step S20, ratio of univalent copper ion and bivalent copper ion in the chlorine leachate shifts to the side of univalent copper ion, and the state with excess bivalent copper ions will be resolved, so it is possible to maintain the reduction power of nickel metal sufficiently.

Figure 8:
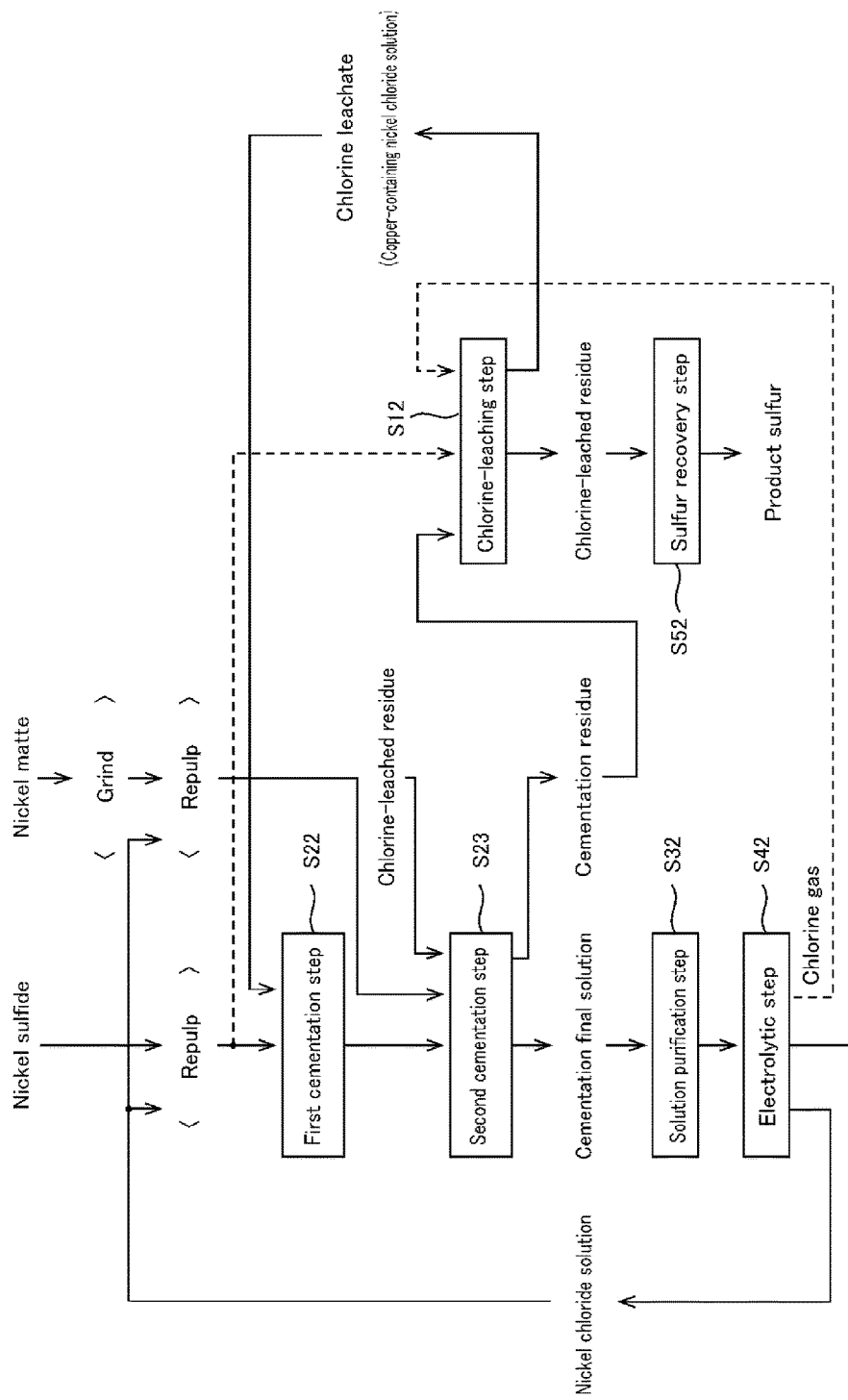
FIG. 8 is a flowchart of conventional electrolytic nickel manufacturing process by chlorine-leaching (patent document 3).

Namely, liquid phase obtained by solid-liquid separation of slurry obtained by mixing and stirring each byproduct and prescribed solution, is the liquid phase leaching nickel remaining in each byproduct, so dissolved chlorine will be consumed as nickel chloride. In association with this, coexisting copper ion will be decreased to the extent of 350 mV at oxidation-reduction potential on the basis of Ag/AgCl, in which existence ratio of univalent copper ion and bivalent copper ion will be in balance, so, for example, a first phase cementation step (first cementation step S22) by nickel chloride, which was necessary in conventional electrolytic nickel manufacturing process illustrated in FIG. 8 will be unnecessary.

As explained in the above, in the nickel recovery process, chlorine and copper-containing aqueous solution with a chlorine dissolving amount of 80 g/L to 390 g/L, and also, with a copper concentration of 30 g/L to 70 g/L, is added to each byproduct of electrolytic nickel manufacturing process. Further, solid content in the concentration of slurry obtained by adding chlorine and copper-containing aqueous solution to each byproduct is adjusted to 130 g/L to 350 g/L.

By applying such nickel recovery process to the electrolytic nickel manufacturing process, it is possible to recover nickel from the byproducts of the electrolytic nickel manufacturing process by chlorine-leaching efficiently, and to decrease nickel remaining in the byproducts, and also, it is possible to achieve simplification of the cementation step simultaneously.

EXAMPLES

The present invention is further explained in detail by examples and comparative examples in the following descriptions, but the present invention will not be limited at all by these examples.

In addition, the common conditions in the examples and comparative examples are as follow, and starting solution and raw materials to be used are indicated in table 1 and table 2.

|  | Component grade (weight %) | | | | |
| --- | --- | --- | --- | --- | --- |
| Raw material | Ni | Co | Cu | Fe | S |
| $S^0$ slurry | 19.9 | 2.8 | 0.30 | 0.22 | 68.8 |
| Residue flaker | 5.4 | 0.7 | 0.07 | 0.07 | 90.0 |
| Chlorine-leached residue | 7.2 | 0.9 | 0.04 | 0.07 | 84.4 |

|  |  | Oxidation-reduction potential | Component concentration (g/L) | | |
| --- | --- | --- | --- | --- | --- |
| Starting solution No. | pH | Ag/AgCl (mV) | Ni | Cu | Cl |
| Starting solution 1 | 0.34 | 580 | 140 | 38 | 310 |
| Starting solution 2 | −0.43 | 573 | 180 | 54 | 300 |
| Starting solution 3 | −1.03 | 578 | 230 | 70 | 390 |
| Starting solution 4 | 0.03 | 696 | 0 | 52 | 80 |

(Adjustment of Reaction Starting Solution)

400 mL of a starting solution 1 indicated in table 2 was poured into 500 mL of separable flask with baffle plate, and heated to be 100° C. to 105° C. in oil bus while stirring in rotational speed of 300 rpm. In addition, starting solutions 2 to 4 indicated in table 2 were also adjusted as well as the starting solution 1.

Example 1

In example 1, 140 g of $S^0$ slurry was poured into the starting solution 1 heated by the previous adjustment process, and liquid temperature was adjusted so that the reaction temperature would be 100° C. to 110° C., and reacted for four hours.

After reaction, in the example 1, solid-liquid separation was performed by suction filtration, and leached residue 1 (solid phase) and leachate 1 (liquid phase) were obtained.

Example 2

In example 2, it was performed as same as the example 1 except that 140 g of residue flaker was poured into the starting solution 1, and leached residue 2 (solid phase) and leachate 2 (liquid phase) were obtained.

Example 3

In example 3, it was performed as same as the example 1 except that 140 g of chlorine-leached residue was poured into the starting solution 1, and leached residue 3 (solid phase) and leachate 3 (liquid phase) were obtained.

Example 4

In example 4, it was performed as same as the example 1 except that 116 g of $S^0$ slurry was poured into the starting solution 1, and leached residue 4 (solid phase) and leachate 4 (liquid phase) were obtained.

Example 5

In example 5, it was performed as same as the example 1 except that 72 g of $S^0$ slurry was poured into the starting solution 1, and leached residue 5 (solid phase) and leachate 5 (liquid phase) were obtained.

Example 6

In example 6, it was performed as same as the example 1 except that 52 g of $S^0$ slurry was poured into the starting solution 1, and leached residue 6 (solid phase) and leachate 6 (liquid phase) were obtained.

Example 7

In example 7, it was performed as same as the example 1 except that 30 g of $S^0$ slurry was poured into the starting solution 1, and leached residue 7 (solid phase) and leachate 7 (liquid phase) were obtained.

Example 8

In example 8, it was performed as same as the example 1 except that 72 g of residue flaker was poured into the starting solution 1, and leached residue 8 (solid phase) and leachate 8 (liquid phase) were obtained.

Example 9

In example 9, it was performed as same as the example 1 except that 30 g of residue flaker was poured into the starting solution 1, and leached residue 9 (solid phase) and leachate 9 (liquid phase) were obtained.

The measurements of concentration and grade of each component contained in the leached residues 1 to 9 and the leachates 1 to 9 obtained by the examples 1 to 9 were performed by ICP emission spectral analysis. And the analysis results thereof were indicated altogether in table 3 and table 4.

Comparative Example 1

In comparative example 1, it was performed as same as the example 1 except that 140 g of $S^0$ slurry was poured into 400 mL of starting solution 2 heated by the adjustment process, and leached residue 10 (solid phase) and leachate 10 (liquid phase) were obtained.

Comparative Example 2

In comparative example 2, it was performed as same as the example 1 except that 140 g of chlorine-leached residue was poured into the starting solution 2 heated by the adjustment process, and leached residue 11 (solid phase) and leachate 11 (liquid phase) were obtained.

Comparative Example 3

In comparative example 3, it was performed as same as the example 1 except that 140 g of chlorine-leached residue was poured into 400 mL of starting solution 3 heated by the adjustment process, and leached residue 12 (solid phase) and leachate 12 (liquid phase) were obtained.

Comparative Example 4

<Preparation of Starting Solution 4>
In comparative example 4, starting solution 4 was obtained by dissolving reagent of cupric chloride in pure water, and by adjusting it to pH 0.00 (25° C.) by hydrochloric acid. Copper concentration of the obtained starting solution 4 was 52 g/L, and dissolved chlorine concentration of the obtained starting solution 4 was 80 g/L.

In the comparative example 4, it was performed as same as the example 1 except that 140 g of $S^0$ slurry was poured into 400 mL of starting solution 4 heated by the adjustment process, and leached residue 13 (solid phase) and leachate 13 (liquid phase) were obtained.

Comparative Example 5

In comparative example 5, it was performed as same as the example 1 except that 140 g of chlorine-leached residue was poured into the starting solution 4 heated by the adjustment process, and leached residue 14 (solid phase) and leachate 14 (liquid phase) were obtained.

The measurements of concentration and grade of each component contained in the leached residues 10 to 14 and the leachates 10 to 14 obtained by the comparative examples 1 to 5 were performed by ICP emission spectral analysis. And the analysis results thereof were indicated altogether in table 3 and table 4.

TABLE 3

| Leached residue No. | Leached residue grade (weight %) | | | | | Reaction condition | | | |
| --- | --- | --- | --- | --- | --- | --- | --- | --- | --- |
| | Ni | Co | Cu | Fe | S | Test No. | Starting solution | Raw material | Slurry concentration |
| Leached residue 1 | 15.6 | 2.4 | 5.7 | 0.17 | 69.6 | Example 1 | Starting solution 1 | $S^0$ slurry | 350 g/L |
| Leached residue 2 | 2.9 | 0.5 | 4.2 | 0.04 | 86.3 | Example 2 | | Residue flaker | |
| Leached residue 3 | 4.9 | 0.8 | 0.2 | 0.05 | 85.1 | Example 3 | | Chlorine-leached residue | |
| Leached residue 4 | 15.5 | 2.4 | 5.7 | 0.17 | 70.3 | Example 4 | | $S^0$ slurry | 290 g/L |
| Leached residue 5 | 13.3 | 2.2 | 8.3 | 0.15 | 66.5 | Example 5 | | | 180 g/L |
| Leached residue 6 | 11.8 | 2.1 | 10.6 | 0.15 | 70.4 | Example 6 | | | 130 g/L |
| Leached residue 7 | 8.9 | 1.6 | 15.8 | 0.11 | 69.9 | Example 7 | | | 75 g/L |
| Leached residue 8 | 2.2 | 0.4 | 2.9 | 0.03 | 91.5 | Example 8 | | Residue flaker | 180 g/L |
| Leached residue 9 | 2.4 | 0.4 | 0.1 | 0.03 | 88.4 | Example 9 | | | 75 g/L |
| Leached residue 10 | 15.9 | 2.5 | 1.6 | 0.18 | 78.9 | Comparative example 1 | Starting solution 2 | $S^0$ slurry | 350 g/L |
| Leached residue 11 | 3.8 | 0.6 | 0.2 | 0.05 | 89.5 | Comparative example 2 | | Chlorine-leached residue | |
| Leached residue 12 | 2.6 | 0.5 | 0.3 | 0.03 | 91.1 | Comparative example 3 | Starting solution 3 | | |
| Leached residue 13 | 18.5 | 2.7 | 3.3 | 0.19 | 69.2 | Comparative example 4 | Starting solution 4 | $S^0$ slurry | |
| Leached residue 14 | 6.9 | 1.0 | 0.3 | 0.07 | 86.6 | Comparative example 5 | | Chlorine-leached residue | |

TABLE 4

| Leachate No. | pH | Oxidation-reduction potential Ag/AgCl (mV) | Leachate concentration (g/L) | | | Test No. | Reaction condition | | |
| --- | --- | --- | --- | --- | --- | --- | --- | --- | --- |
| | | | Ni | Cu | Cl | | Starting solution | Raw material | Slurry concentration |
| Leachate 1 | −0.19 | 353 | 160 | 16 | 240 | Example 1 | Starting solution 1 | $S^0$ slurry | 350 g/L |
| Leachate 2 | −0.06 | 454 | 150 | 31 | 230 | Example 2 | | Residue flaker | |
| Leachate 3 | −0.38 | 405 | 160 | 38 | 290 | Example 3 | | Chlorine-leached residue | |
| Leachate 4 | −0.08 | 340 | 150 | 18 | 260 | Example 4 | | $S^0$ slurry | 290 g/L |
| Leachate 5 | −0.11 | 369 | 150 | 20 | 270 | Example 5 | | | 180 g/L |
| Leachate 6 | −0.21 | 392 | 145 | 23 | 290 | Example 6 | | | 130 g/L |
| Leachate 7 | −0.15 | 448 | 140 | 25 | 310 | Example 7 | | | 75 g/L |
| Leachate 8 | 0.18 | 477 | 140 | 32 | 240 | Example 8 | | Residue flaker | 180 g/L |
| Leachate 9 | 0.21 | 509 | 135 | 35 | 260 | Example 9 | | | 75 g/L |
| Leachate 10 | −0.77 | 359 | 190 | 57 | 310 | Comparative example 1 | Starting | $S^0$ slurry | 350 g/L |

TABLE 4-continued

| Leachate No. | pH | Oxidation-reduction potential Ag/AgCl (mV) | Leachate concentration (g/L) | | | Test No. | Reaction condition | | |
|---|---|---|---|---|---|---|---|---|---|
| | | | Ni | Cu | Cl | | Starting solution | Raw material | Slurry concentration |
| Leachate 11 | −0.78 | 419 | 200 | 54 | 300 | Comparative example 2 | solution 2 | Chlorine-leached residue | |
| Leachate 12 | −1.30 | 441 | 260 | 72 | 390 | Comparative example 3 | Starting solution 3 | | |
| Leachate 13 | −0.23 | 426 | 5.9 | 39 | 65 | Comparative example 4 | Starting | S⁰ slurry | |
| Leachate 14 | −0.17 | 435 | 4.6 | 53 | 80 | Comparative example 5 | solution 4 | Chlorine-leached residue | |

In the examples 1 to 9, as indicated in table 3 and table 4, leaching of nickel was promoted by increase of addition amount of each raw material, and nickel concentration of leachate was increased, on the other hand, chlorine concentration was decreased. Also, in the examples 1 to 9, along with the decrease of chlorine concentration, copper concentration was also decreased. This is because consumption of dissolved choline and reduction of bivalent copper ion into univalent copper ion has progressed, and copper was fixed and removed to solid phase (leached residue) side as copper sulfide.

Figure 2:
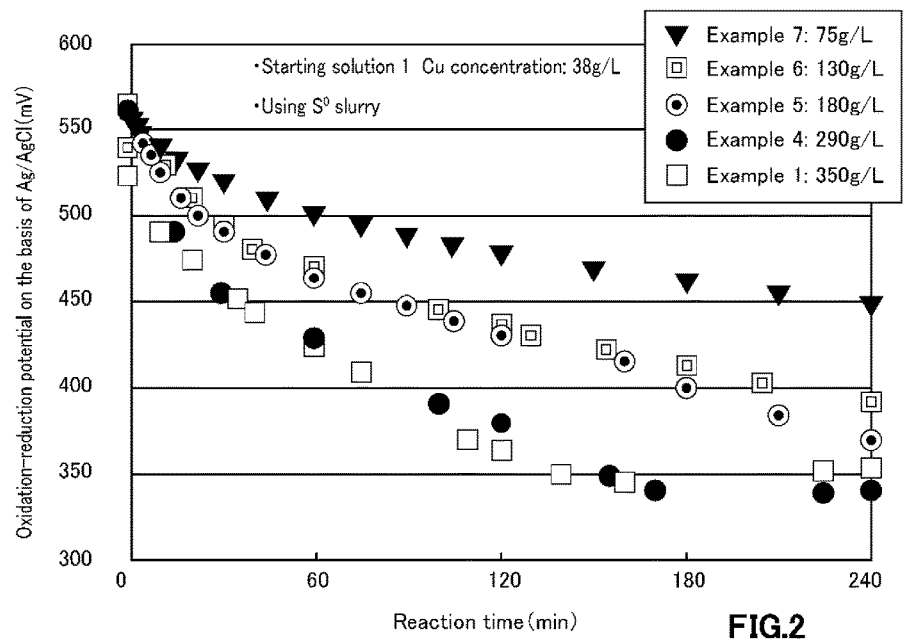
FIG. 2 is a graph showing a reaction time in examples 1 and 4 to 7 and a change of oxidation-reduction potential on the basis of Ag/AgCl.
Figure 3:
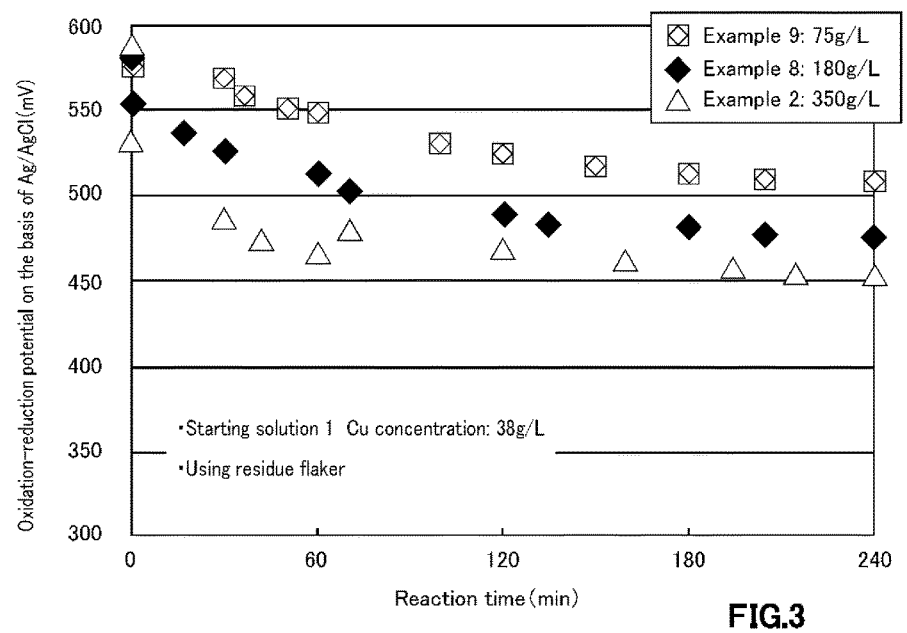
FIG. 3 is a graph showing a reaction time in examples 2, 8 and 9 and a change of oxidation-reduction potential on the basis of Ag/AgCl.
Figure 4:
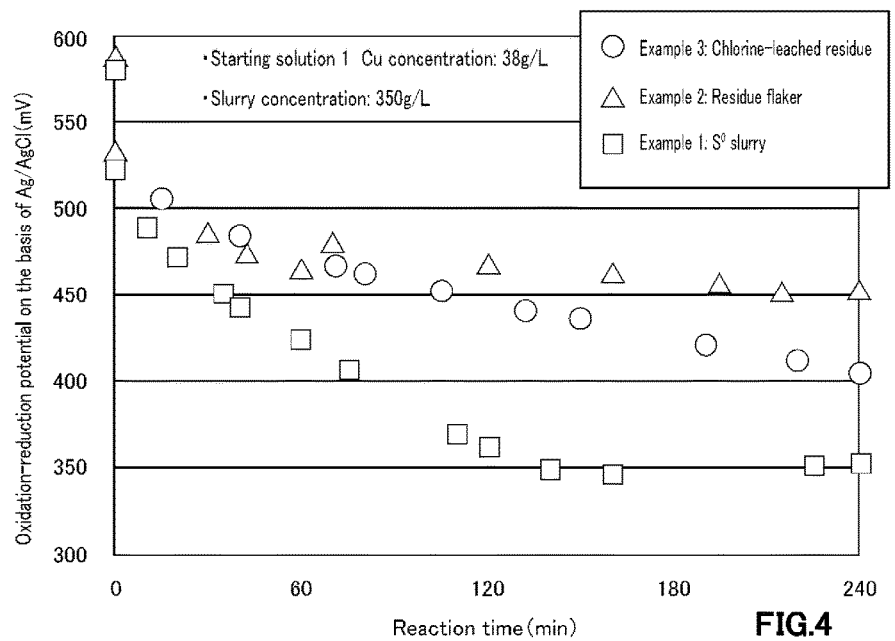
FIG. 4 is a graph showing a reaction time in examples 1 to 3 and a change of oxidation-reduction potential on the basis of Ag/AgCl.

In the examples 1 to 9, "reaction time and change of oxidation-reduction potential on the basis of Ag/AgCl", when each raw material was leached using the starting solution 1, were measured, and measurement results were illustrated as graph in FIGS. 2 to 4.

In the examples 1 to 9, as illustrated in FIGS. 2 to 4, when addition amount of each raw material was increased (slurry concentration was increased), oxidation-reduction potential on the basis of Ag/AgCl of the leachate was decreased quickly.

As illustrated in FIG. 2, it was found that oxidation-reduction potential on the basis of Ag/AgCl became constant (equilibrium in reaction) in the order of 330 mV to 350 mV, and that further addition of each raw material or extension of reaction time was not necessary.

In addition, as illustrated in FIG. 4, with respect to reactivity of each raw material, S° slurry was fastest, and then chlorine-leached residue, and residue flaker was slowest.

Figure 5:
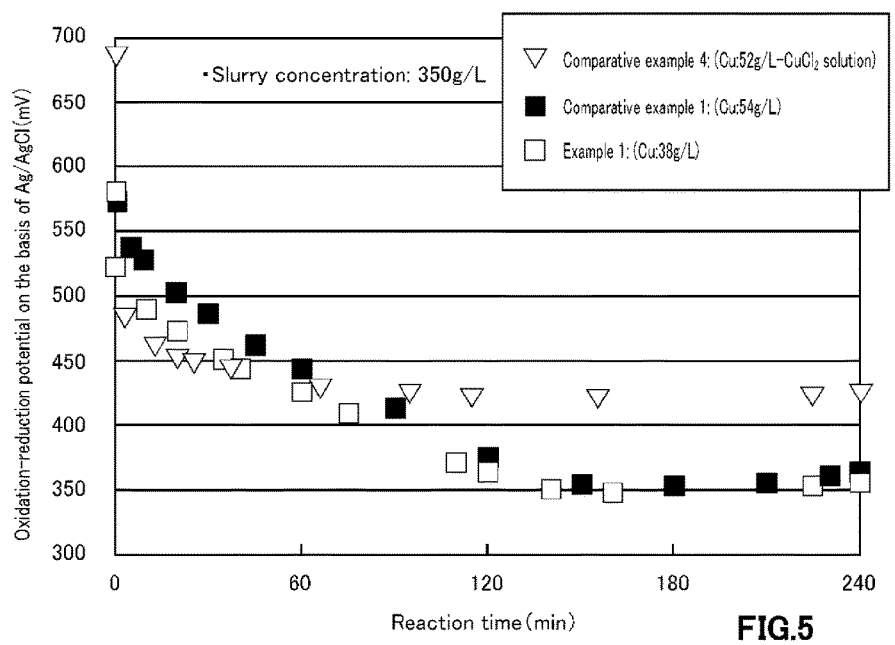
FIG. 5 is a graph showing a reaction time in example 1 and comparative examples 1 and 4 and a change of oxidation-reduction potential on the basis of Ag/AgCl.
Figure 6:
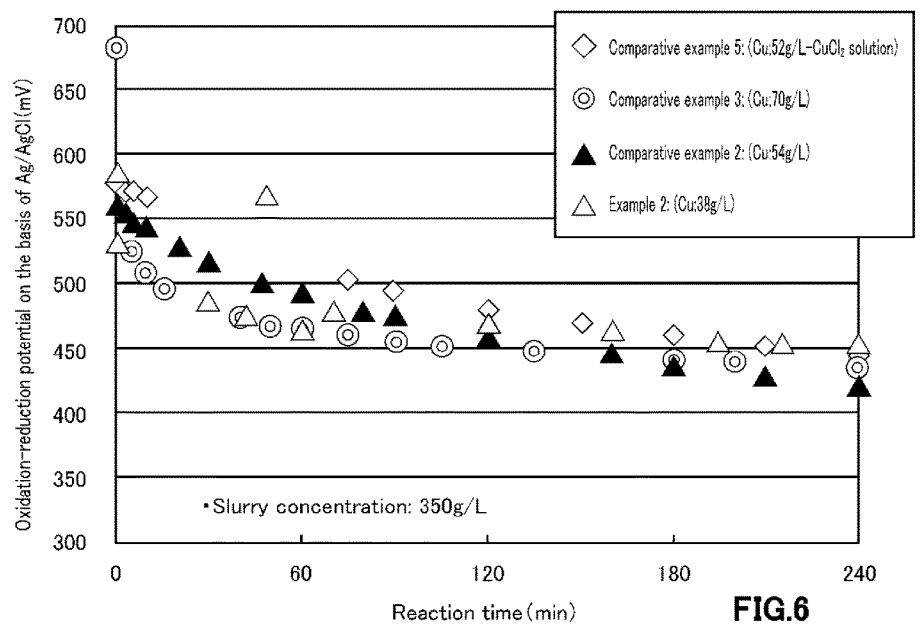
FIG. 6 is a graph showing a reaction time in example 2 and comparative examples 2, 3 and 5 and a change of oxidation-reduction potential on the basis of Ag/AgCl.

In the comparative examples 1 to 5, "reaction time and change of oxidation-reduction potential on the basis of Ag/AgCl", when each raw material was leached using the starting solutions 2 to 4, were measured, and measurement results were illustrated as graph in FIGS. 5 and 6. In addition, in FIGS. 5 and 6, the results of examples 1 and 2 using starting solution 1 were also described for comparison.

In the comparative examples 1 to 5, as illustrated in FIGS. 5 and 6, as copper ion concentration in the starting solution was increased, the amount of bivalent copper ion, which requires reduction, was increased, so decreasing speed of oxidation-reduction potential on the basis of Ag/AgCl became slow.

Also, in the comparative examples 4 and 5 using the starting solution 4, oxidation-reduction potential on the basis of Ag/AgCl of final solution became balanced around 420 mV to 430 mV. This result was different from the other examples and comparative examples, but it could be assumed that balance of equilibrium in reaction indicated in the following reaction formulas 1 and 2 became different, as all copper ion contained in the starting solution were bivalent copper ion, and as amount of chloride ion was also small.

$$Ni^0 + 2CuCl_2 \rightarrow NiCl_2 + 2CuCl \qquad \text{(Reaction Formula 1)}$$

$$Ni^0 + S^0 + 2CuCl \rightarrow NiCl_2 + Cu_2S \qquad \text{(Reaction Formula 2)}$$

As mentioned above, from the results of the examples 1 to 9 and the comparative examples 1 to 5, it was understood that it is possible to recover nickel by slurrying the residue again by aqueous solution after solid-liquid separating the residue (for example, chlorine-leached residue of FIG. 1) produced in the chlorine-leaching step (for example, chlorine-leaching step S10 of FIG. 1), and by performing mixing treatment with solution containing cupric chloride. In addition, it was considered that recovery amount of nickel is proportional with the amount of excess chloride ion of liquid phase, so it was understood that it is possible to recover nickel more efficiently if copper ion concentration is higher.

The invention claimed is:

1. A nickel recovery process for recovering nickel from a byproduct of an electrolytic nickel manufacturing process, comprising:
    a chlorine-leaching step including oxidizing and leaching nickel sulfide to obtain a chlorine leachate and a chlorine-leached residue;
    a cementation step including fixing copper in the chlorine leachate to remove copper from the chlorine leachate;
    a sulfur recovery step including making the chlorine-leached residue into a first slurry in a melting tank, followed by performing a solid-liquid separation to obtain a sulfur-containing solution and a residue; and
    a nickel recovery step including: (a) mixing the byproduct, which contains 5 wt % to 20 wt % of nickel, with an aqueous solution having: (i) a dissolved chlorine amount of 80 g/L to 390 g/L, and (ii) a copper concentration of 30 g/L to 70 g/L to obtain a second slurry, and (b) performing a solid-liquid separation to separate the second slurry into a solid phase and a liquid phase, wherein the liquid phase is returned into a transportation path from the chlorine-leaching step to the cementation step.

2. The nickel recovery process according to claim 1, wherein the second slurry obtained from the nickel recovery step has a solid content of from 130 g/L to 350 g/L.

3. The nickel recovery process according to claim 1, wherein the solid phase is returned into the cementation step, and the byproduct is slurry repulped from the residue in the sulfur recovery step.

4. The nickel recovery process according to claim 1, wherein the second slurry is returned into the cementation step without the solid-liquid separation, and the byproduct is slurry repulped from the residue in the sulfur recovery step.

5. The nickel recovery process according to claim 1, wherein the solid phase is discharged out of a system of the electrolytic nickel manufacturing process, and the byproduct is a chlorine-leached residue: (i) obtained from the sulfur recovery step, and (ii) adhered to an inner wall of the melting tank.

6. The nickel recovery process according to claim 1, wherein the solid phase is returned into the sulfur recovery step, and the byproduct is a part of the chlorine-leached residue obtained from the chlorine-leaching step.

7. The nickel recovery process according to claim 1, wherein the chlorine leachate obtained from the chlorine-leaching step is used instead of the aqueous solution.

8. The nickel recovery process according to claim 1, wherein the byproduct includes the residue obtained in the sulfur recovery step.

\* \* \* \* \*